Nov. 3, 1953  H. G. DANIELS ET AL  2,657,740
SPRING SEAT STRUCTURE
Filed Sept. 24, 1951
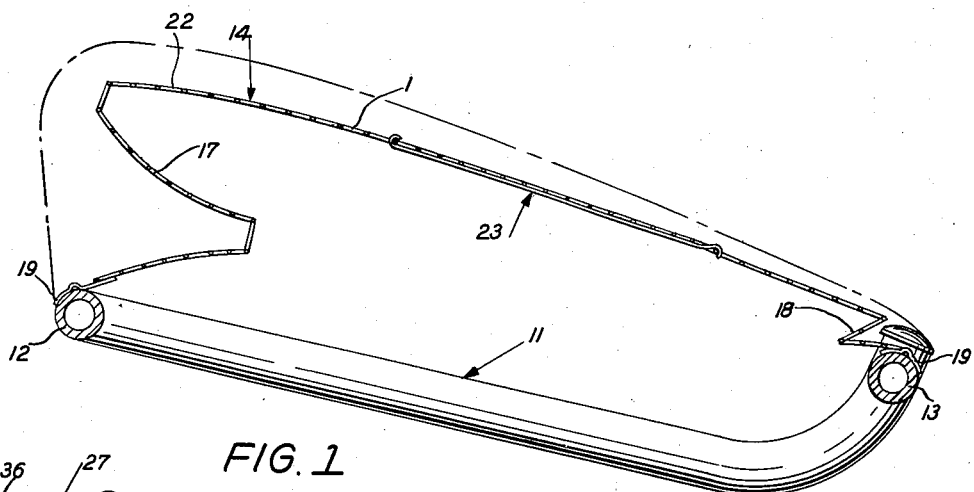
FIG. 1
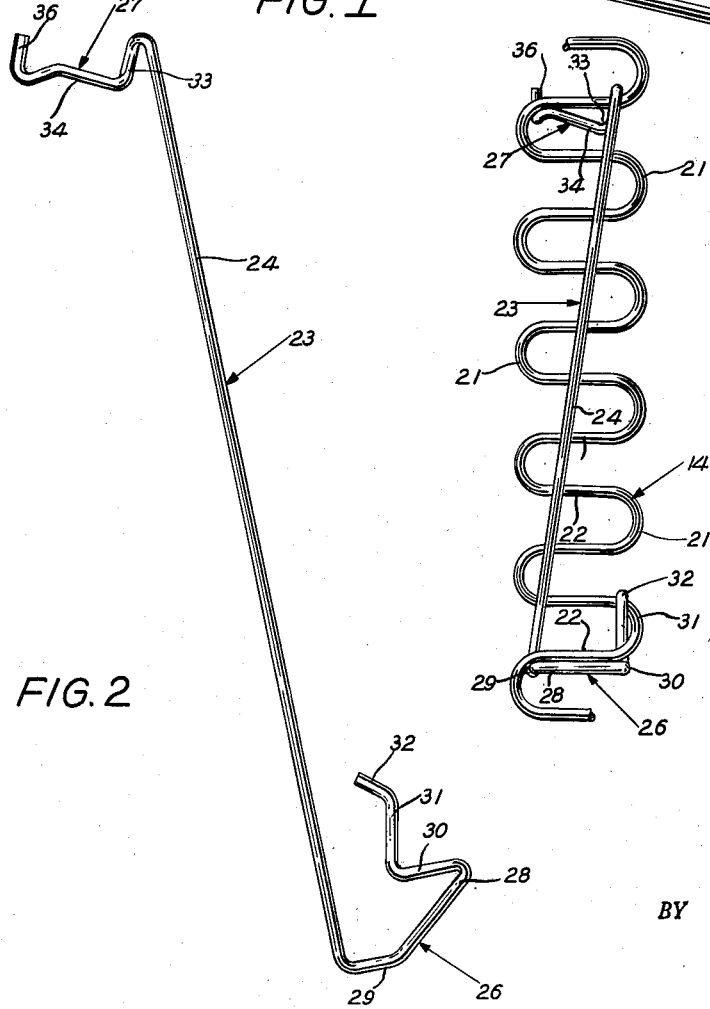
FIG. 2
FIG. 3
H. G. DANIELS
E. C. PICKARD
INVENTORS
BY *E. C. McRae*
   *J. R. Faulkner*
   *J. H. Oster*
ATTORNEYS Patented Nov. 3, 1953

2,657,740

UNITED STATES PATENT OFFICE 2,657,740

SPRING SEAT STRUCTURE

Howard G. Daniels, Dearborn, and Edwin C. Pickard, Detroit, Mich., assignors to Ford Motor Company, Dearborn, Mich., a corporation of Delaware Application September 24, 1951, Serial No. 247,992

1 Claim. (Cl. 155—179)

This invention relates to a spring seat structure for motor vehicles, and more particularly to an auxiliary tension spring for cushioned seat structures employing flat wire springs of sinuous or corrugated shape.

It is an object of the present invention to provide auxiliary wire springs which may be readily applied to the zigzag springs of seat cushions to stiffen the latter as desired. It has been common practice in connection with seat cushions of the coil spring type to supply as an accessory auxiliary spring units for assembly to the seat cushion in various selected positions to vary the load carrying capacity and the stiffness of the seat to accommodate persons of various weights. By properly inserting auxiliary springs in the seat it is thus possible with coil spring seats to adjust the latter to efficiently and comfortably accommodate the weight of the particular persons most frequently using the vehicle. An object of the present invention is to enable similar adjustments to be made with seat cushions of the zigzag type. This is accomplished by providing auxiliary wire springs which may be selectively attached to certain of the individual zigzag springs of the seat structure to adjust the seat for individual use. The auxiliary wire springs may be placed at different positions upon the zigzag springs and may also be provided in various lengths to provide a wide range of adjustment of the riding characteristics of the seat.

It is a further object of the invention to provide an auxiliary wire unit which is inexpensive in cost and which is easy to install and can be attached to the seat rapidly and without alterations in the latter. In a preferred embodiment of the invention the auxiliary wire member is adapted to be clipped to the underside of a zigzag spring to form a tension wire restraining extension of the enclosed part of the zigzag spring when under load. In addition, the auxiliary member may be attached by hand without the use of tools.

Other objects and advantages of this invention will be made more apparent as this description proceeds, particularly when considered in connection with the accompanied drawings, wherein:

Figure 1 is a vertical cross sectional view through a seat cushion incorporating the present invention.

Figure 2 is an enlarged perspective view of an auxiliary wire member prior to its attachment to the seat spring.

Figure 3 is a bottom plan view of a zigzag spring of a seat cushion with an auxiliary wire member attached thereto, as viewed from beneath the seat cushion.

Referring now to the drawings and particularly to Figure 1, the reference character 11 indicates a seat frame formed of hollow tubing and having front and rear rails 12 and 13 respectively.

A plurality of transversely spaced springs 14 extend longitudinally between the front and rear rails of the seat frame. Each spring unit 14 is made of steel wire bent to a sinuous or corrugated shape. Each spring has a seating portion 16 and generally V-shaped portions 17 and 18 at the front and rear in accordance with conventional practice. The opposite ends of each spring are suitably connected by means of brackets 19 to the front and rear rails of the frames.

Each spring 14 is formed of alternate oppositely facing looped portions 21 interconnected by straight portions 22 which are parallel to each other and extend laterally at right angles to the longitudinal center line of the spring.

While it is of course possible to so design the springs of a seat cushion of this type as to provide proper support and riding comfort for passengers of any given weight, the springs are conventionally designed to accommodate passengers of average weight. Consequently, the seat cushion may not provide the desired support and riding characteristics for persons heavier than average weight. The present invention provides auxiliary tension members 23 which may be attached to the springs 14 whenever it is desired to change the characteristics of the seat cushion to accommodate persons of greater than average weight. The invention contemplates the provision of auxiliary tension members of various forms and with different types of attaching means. One embodiment of the invention is described below.

Each auxiliary tension member 23 comprises a straight elongated intermediate body portion 24 of a length sufficient to span a number of the convolutions of the spring 14, and retaining parts indicated generally by the reference characters 26 and 27 extending bodily in opposite directions from opposite ends of the body portion 24. The auxiliary tension member 23 is formed of relatively stiff wire.

With reference to Figure 2, and also to Figure 3 which shows the auxiliary tension member attached to the underside of a seat cushion spring 14, the retaining end part 26 of the tension member has a laterally extending portion 28 joined to the body portion 24 of the member by means of an interconnecting portion 29 bent upwardly from the body portion. A return bent portion 30 is formed at the opposite end of the laterally extending portion 28 and is generally parallel to the interconnecting portion 29 at the opposite end of the laterally extending portion 28. As best seen in Figure 3, the portions 29 and 30 are adapted to be hooked around one of the straight portions 22 of the spring 14 to prevent displacements of the tension member 23 relative to the spring 14 in one direction longitudinally of the spring. The return bent portion 30 of the tension member continues into an end portion 31 terminating in a hook shaped end 32.

It will be apparent from an examination of Figure 3 that the retaining end part 26 of the tension member 23 when assembled to the zigzag spring 14 as shown securely anchors that end of tension member to the spring. In assembling the tension member to the spring, it is this end part 26 which is first assembled and this can be easily accomplished by first positioning the tension member with the body portion 24 extending generally at right angles to the plane of the spring 14 and then swinging it down to the position shown in Figure 3 with the retaining part 26 hooked around the straight portions 22 of the spring.

It will also be noted that the tension member is so constructed as to enable the straight body portion 24 to extend diagonally across the width of the spring 14 from one side thereof to the opposite side. At the opposite end of the tension member 23 the latter is provided with a retaining end part 27 which extends laterally from the straight body portion 24 and in the opposite direction from the retaining part 26 at the other end of the member. The retaining part 27 comprises a return bent looped part 33 adapted to be hooked over one of the straight portions 22 of the zigzag spring, an intermediate connecting part 34, and a hooked-shaped end portion 36 opening upwardly as seen in Figure 3 and engaging the straight portion 22 of the spring last referred to.

With the laterally extending end part 26 of the tension member 23 first attached as mentioned above, it is a simple matter to complete the assembly of the tension member to the spring by hooking the laterally extending end part 27 in place as shown in Figure 3. This is easily accomplished by reasons of the resilience of the spring 14 and also the flexibility of the laterally extending end part 27 of the tension member. The complete assembly can be readily made without the use of tools. Similarly, the tension member can readily be removed from the spring in the event it is no longer needed.

In operation the tension member 23 prevents extension of the convolutions of the zigzag springs 14 which are embraced within the length of the tension member. This of course strengthens the spring, and enables it to properly support heavier than average passengers.

The effect of the tension members may be varied somewhat by changing their location lengthwise of the seating portion of the spring, and in addition tension members of various lengths may be provided which may be selectively used with the spring depending upon the weight of the passenger for which the seat cushion spring is being adjusted. Furthermore, the tension members may be connected to each zigzag spring of the seat cushion in a particular area involved, or they may be assembled only to alternate springs or in any other manner which may provide the desired result. It will be apparent that the construction described above enables vehicle seat cushions of the zigzag type to be readily adapted to provide the most advantageous support and riding comfort for each passenger. Furthermore, the cost of the additional parts necessary to effect this result is relatively low, and likewise the cost of assembling the part to the seat cushion is low.

It will be understood that the invention is not to be limited to the exact construction shown and described, but that various changes and modifications may be made without departing from the spirit and scope of the invention, as defined in the appended claim.

What is claimed is:

In a vehicle seat cushion having a generally horizontal seating portion formed of a plurality of sinuously corrugated wire springs each having alternate oppositely facing loop portions and straight parallel portions interconnecting adjacent loop portions, a plurality of auxiliary tension wire members removably attached to the under side of the seating portions of said springs, each of said wire members having an elongated intermediate body portion positioned beneath one of said springs and spanning a plurality of the straight parallel portions of the spring, one end of said wire member being bent over one of the straight portions of said spring at the junction of said straight portion and the adjacent loop portion, said end of the wire member having a laterally extending part engaging the side of said last mentioned straight portion opposite the intermediate body portion of the wire member and extending the entire length of said straight portion, said extruding part of the wire member having a portion bent over said last mentioned straight portion and having a hook extending under the next adjacent straight portion of the spring and generally parallel to the intermediate body portion of the wire member, the opposite end of said wire member extending beneath one of the straight portions of the spring at the junction of said last mentioned straight portion and the adjacent loop portion and bent around said last mentioned straight portion and continuing into a laterally extending part having a downwardly facing hook at its terminal end engaging the other end of said last named straight portion of the spring at the junction of said last named straight portion and the adjacent loop portion, the laterally extending parts at opposite ends of the intermediate body portion of the wire member extending in opposite directions from said body portion with the hooks at the terminal ends of the wire member opening in opposite directions, the laterally extending parts at opposite ends of the intermediate body portion of the wire member being coextensive in length with the length of the straight intermediate portions of the spring to effectively prevent lateral movement of the end portions of said wire member relative to the spring and so that the straight intermediate body portion of said wire member extends diagonally across the width of said sinuous spring.

HOWARD G. DANIELS.
EDWIN C. PICKARD.

References Cited in the file of this patent

UNITED STATES PATENTS

| Number | Name | Date |
| --- | --- | --- |
| 611,648 | Robinson | Oct. 4, 1898 |
| 2,047,411 | Freund | July 14, 1936 |
| 2,249,048 | Sandor | July 15, 1941 |